United States Patent [19]

Bradburn

[11] Patent Number: 4,945,968
[45] Date of Patent: Aug. 7, 1990

[54] TIRE DERIMMER AND METHOD FOR TIRE DERIMMING

[75] Inventor: Marvin Bradburn, Muncie, Ind.
[73] Assignee: Car-Go Corporation, Muncie, Ind.
[21] Appl. No.: 420,666
[22] Filed: Oct. 10, 1989

Related U.S. Application Data

[63] Continuation of Ser. No. 175,756, Mar. 31, 1988, abandoned.

[51] Int. Cl.⁵ .............................................. B60C 25/06
[52] U.S. Cl. .................................. 157/1.17; 157/1.1; 157/1.28
[58] Field of Search ........................ 157/1.0, 1.1, 1.17, 157/1.26, 1.28, 1.2, 11

[56] References Cited

U.S. PATENT DOCUMENTS

| | | | |
|---|---|---|---|
| 2,618,320 | 11/1952 | Deysher et al. | 157/1.2 |
| 2,704,570 | 3/1955 | Reeves | 157/1.2 |
| 4,083,394 | 4/1978 | Heikkinen et al. | 157/1.21 |
| 4,306,606 | 12/1981 | Grasso | 157/1.1 |
| 4,355,674 | 10/1982 | Grasso | 157/1.2 |

FOREIGN PATENT DOCUMENTS 61-139503  6/1986  Japan ..................................... 157/1.1

OTHER PUBLICATIONS

Multitek, Inc., "Squeeze Greater Profits out of Scrap Wheels", advertisement for WC-500 Wheel Crusher.

Primary Examiner—D. S. Meislin
Attorney, Agent, or Firm—Lundy and Walker

[57] ABSTRACT

A tire derimmer and method for derimming, the tire derimmer including a base edge partially bounding the opening. A jaw is movable between a raised position and a lowered position. The jaw is disposable in the lowered position to clamp a tire against the base, adjacent the opening and opposite the working edge. A ram is connected to the jaw. The ram is extendible against a wheel mounted to a tire clamped by the jaw, to pivot the wheel about the working edge and separate the wheel from the tire.

12 Claims, 4 Drawing Sheets

TIRE DERIMMER AND METHOD FOR TIRE DERIMMING

This is a continuation of co-pending application Ser. No. 07/175,756 filed on Mar. 31, 1988.

BACKGROUND OF THE INVENTION

The invention relates to tire derimming and more particularly to a tire derimmer and a method for tire derimming.

Past derimming machines and methods have suffered from a number of shortcomings, particularly slow speed and mechanical intricacy requiring precision moving parts subject to relatively rapid wear. Past tire derimming machines can be divided into those used in service stations and the like, which separate the tire carcass and wheel without destroying either and those machines which destroy one or both during the derimming operation.

The former machines require that the tire first be deflated, lifted onto a table and clamped; then the tire's bead is broken by successive precise applications of a pneumatic lever to the tire's bead, the bead is then forced over the rim by circular motion of a prybar and the operation is repeated for the other side of the tire. Large amounts of operator effort are required and tooling for supporting and applying force to the rim and the tire carcass must be relatively accurately sized to specific tires and rims. Some machines have solved this sizing problem by providing complex adjustment mechanisms for resizing the working head of the machine to particular wheels and tires.

Several varieties of the water machines have derimmed tires by destroying the tire carcass or wheel or both. With some such machines, the tire carcass is pierced to release air and to better clamp and grip the tire. Other derimming machines crush the wheel, which may then be removed from the tire carcass. The tire carcass may also be destroyed in that operation. These tire crushing machines operate rapidly and may be used on a number of different sizes of wheels and tires, but consume large amounts of energy.

It is therefore highly desirable to provide an improved tire derimmer and an improved method for tire derimming.

It is also highly desirable to provide an improved tire derimmer and an improved method for tire derimming which require few operating parts either subject to rapid wear or having close tolerances It is also highly desirable to provide an improved tire derimmer and an improved method for tire derimming which accommodate a large variety of tires ad rims without requiring individual adjustments or changes in work holding and pressure applying parts.

It is also highly desirable to provide an improved tire derimmer and an improved method for tire derimming which require low amounts of operator effort.

It is also highly desirable to provide an improved tire derimmer and an improved method for tire derimming in which there is little sensitivity to the location and adjustment of machine and work parts It is also highly desirable to provide an improved tire derimmer and an improved method for tire derimming in which tires are separated from wheels rim without separately deflating the tires.

It is also highly desirable to provide an improved tire derimmer and an improved method for tire derimming in which tires and wheels can be separated without flipping the tire from one side to the other.

It is also highly desirable to provide an improved tire derimmer and an improved method for tire derimming in which wheels are separated from tires without bending, deforming or breaking the wheels.

It is finally highly desirable to provide an improved tire derimmer and an improved method for tire derimming which combines all of the above desire features.

SUMMARY OF THE INVENTION

It is an object of the invention to provide an improved tire derimmer and an improved method of tire derimming.

It is also an object of the invention to provide an improved tire derimmer and an improved method for tire derimming which require few operating parts either subject to rapid wear or having close tolerances.

It is also an object of the invention to provide an improved tire derimmer and an improved method for tire derimming which accommodate a large variety of tires and rims without requiring individual adjustments or changes in work holding and pressure applying parts.

It is also an object of the invention to provide an improved tire derimmer and an improved method for tire derimming which require low amounts of operator effort.

It is also an object of the invention to provide an improved tire derimmer and an improved method for tire derimming in which there is little sensitivity to the location and adjustment of machine and work parts.

It is another object of the invention to provide an improved tire derimmer and an improved method for tire derimming in which the tire and wheel can be separated without flipping the tire from one side to the other.

It is another object of the invention to provide an improved tire derimmer and an improved method for tire derimming in which the tires and wheels can be separated without flipping the tires from one side to the other.

It is another object of the invention to provide an improved tire derimmer and an improved method for tire derimming in which the wheels are separated from the tire without bending, deforming or breaking the wheels.

It is finally an object of the invention to provide an improved tire derimmer and an improved method for tire derimming which combine all of the above desire features.

In the broader aspects of the inventions there is provided a tire derimmer including a base edge partially bounding an opening. A jaw is movable between a raised position and a lowered position. The jaw is disposable in the lowered position to clamp a tire against the base, adjacent the opening and opposite the working edge. A ram is connected to the jaw. The ram is extendible against a wheel mounted to a tire clamped by the jaw, to pivot the wheel about the working edge and separate the wheel from the tire.

BRIEF DESCRIPTION OF THE DRAWINGS

The above mentioned and other features and objects of this invention and the manner of attaining them will become more apparent and the invention will be better understood by reference to the following description of an embodiment of the invention taken in conjunction with the accompanying drawing wherein.

DESCRIPTION OF SPECIFIC EMBODIMENT

Figure 1:
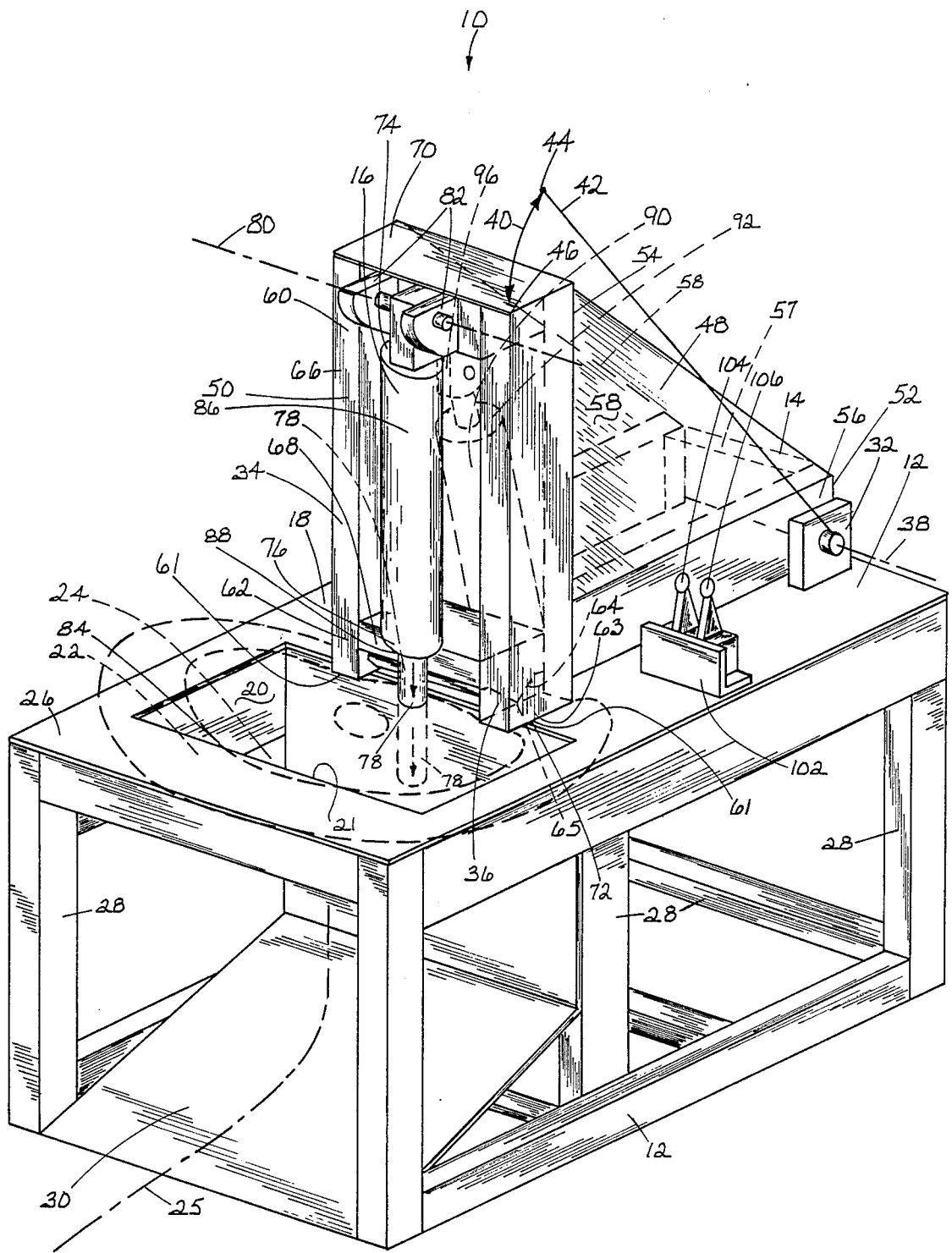
FIG. 1 is an isometric drawing of the tire derimmer of the invention.

The tire derimmer 10 of the invention has a base 12, a jaw 14, which is pivotable toward and away from base 12, and a punch 16 which is supported by jaw 14. Base 12 has a working surface 18, which includes an opening 20.

It is convenient to have base 12 have the shape of a table having a top 26 supported by a frame 28. In that embodiment of the tire derimmer 10 of the invention, opening 20 in top 26 may communicate with chute 30, down which a wheel 24 can slide along path 25 after passage through opening 20.

Jaw 14 is connected to base 12 by one or more pivot blocks 32, which may be bushings or bearings. Pivot block or blocks 32 are connected at one end 34 of jaw 14 and punch 16 is connected at the other end 36 of jaw 14. Pivot block 32 permits jaw 14 to pivot about an axis 38 through an arc 40. FIG. 1 illustrates arc 40 and includes a line 42 drawn between axis 38 and a point 44, which indicates the position assumed by corner 46 of end 36 of jaw 14 upon displacement of arm 14 outward from base 12 through arc 40.

Jaw 14 has an arm portion 48 and a head portion 50. Axis 38 extends through the outer end 52 of arm portion 48. Inner end 54 of arm portion 48 is connected to head 50 portion 50. It is convenient to have arm portion 48 in the form of a pair of spaced apart, longitudinal bolsters 56, extending in the direction of opening 20. Bolsters 56 may each be joined to a separate pivot block 32 at an outer end 52 and bolsters 56 may be joined together by an arm portion crossmember 57. Braces 58 may extend from each bolster 56 and both bolsters 56 and braces 58 may be joined to head portion 50.

Head portion 50 of jaw 14 is adjacent to opening 20 and extends out from top 26. Head portion 50 has an upper end 60 and lower end 62. Punch 16 is mounted to jaw 14 at upper end 60 of head portion 50. Lower end 62 includes a bearing surface 64.

It is convenient to have head portion 50 of jaw 14 in the form of a pair of opposed uprights 66 joined by a lower crossmember 68 and an upper crossmember 70. Bolsters 56 of arm portion 48 may be joined at the lower end 62 of head portion 50 to uprights 66. Bearing surface 61 may include portions of uprights 66 and portions of lower crossmember 68.

Bearing surface 61 may have a variety of shapes. A convenient shape for bearing surface 61, for use on inflated or deflated tires and wheels 84 has been found to consist of a pair of planar hammer portions 63 separated by a wedge-shaped wedge portion 64. It is convenient to have wedge portion 64 have a cross-section in a plane perpendicular to axis 80, of a projection with the shape of a right angle triangle with the ninety decree angle lowermost and centered. The edge 65 of wedge portion 64 is coplanar with hammer portions 63. Edge 65 should be slightly rounded so as to not cut into the tire carcass. Maximum displacement of jaw 14 about axis 38 may be varied, however, it is necessary that jaw 14 be pivotable about axis 38 sufficient that a tire 22 of a mounted tire and wheel 84 can be inserted between bearing surface 64 and an anvil portion 72 of work surface 18 generally underlying bearing surface 61.

Figure 5:
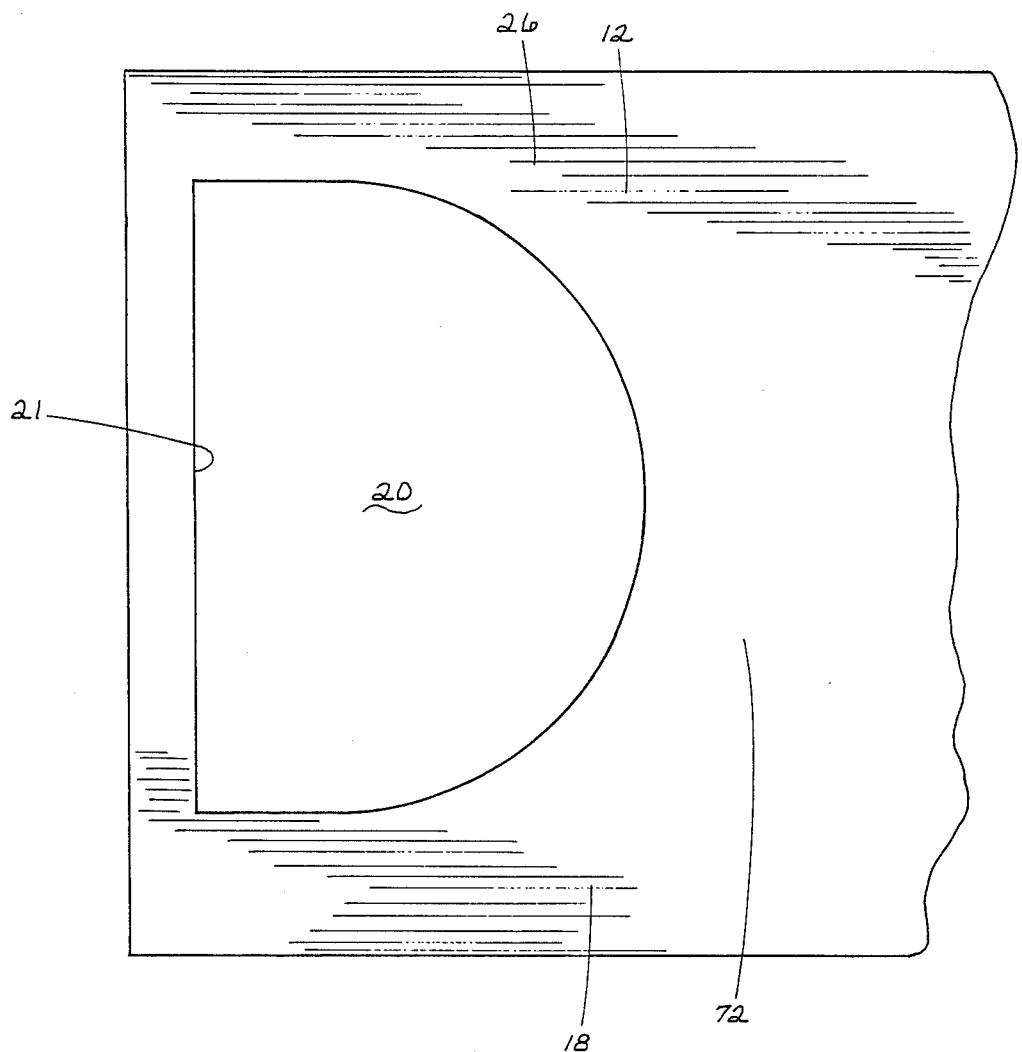
FIG. 5 is a partial top plan view of an alternative tire derimmer of the invention.

The shape of anvil portion 72 of working surface 18 may be varied and is determined, in part, by the shape of opening 20. Working surface 18 and opening 20 are sized and shaped to support a tire 22 and to receive a wheel 24, respectively. FIG. 1 illustrates opening 20 as rectangular, however, opening 20 may also be roughly semicircular as illustrated in FIG. 5. The semicircular opening 20 is desirable to provide additional support to the tire carcass during operation of the tire derimmer 10 of the invention.

The length of opening 20 in a direction radial to axis 38 is smaller than the diameter of a wheel 24 to be derimmed by the apparatus 10 of the invention. The width of opening 20 in direction perpendicular to the aforementioned length of opening 20 is larger than the diameter of the wheel 24 to be derimmed and smaller than the diameter of the tire 22 to be removed from the wheel 24. This means that opening 20 must, technically, be sized to the wheels 24 and tires 22 to be derimmed. However, in practice, the opening 20 may be sized to barely pass a wheel 24 of a maximum desired size pivoted into the opening and the opening 20 will then be sized to a wide range of wheel sizes smaller than that maximum. For example, an opening sized for wheels no larger than 17 inches in diameter may be used with wheels having diameters between about 12 inches and about 17 inches.

Opening 20 is bounded, opposite jaw 14, by a working edge 21 of top 26. A wheel 24 can be pivoted about working edge 21, from a position in which the longest dimension of the wheel 24 is parallel to a plane through working surface 18, into and through opening 20. In a specific embodiment of the invention 10, working edge 21 is at least generally straight and at least roughly parallel to axis 38.

Punch 16 has an upper end 74 which is pivotably connected to the upper end 60 of head portion 50 and a lower end 76 which includes a ram 78. Punch 16 pivots from upper end 74 about axis 80. In a specific embodiment of the invention, punch 16 is freely pivotable about axis 80. Ram 78 is movable rectilinearly toward and away from axis 80.

It is convenient to have punch 16 suspended from a pair of pivot blocks 82, which may be bushings or bearings, and which are set out from upper crossmember 70 of head portion 50 sufficent such that ram 78 overlies a wheel 24 when a tire 22 of a mounted tire and wheel 84 is positioned between bearing surface 61 and anvil portion 72. If axis 80 is set out from upper crossmember 70 of head portion 50, punch 16 may be freely pivotable from upper end 60 of head portion 50. This is convenient because the positioning of ram 78 over wheel 24 may thus be provided by action of gravity on punch 16 during the operation of the tire derimmer 10 of the invention.

Force may be supplied to jaw 14 to move jaw 14 from a raised position to a lowered position and to retain jaw 14 in raised position for loading and in lowered position for clamping of a tire by a variety of means such as electrically, hydraulically, pneumatically. Force may be supplied to extend or retract ram 78 by the same or different means.

It is convenient to have punch 16 have a hydraulic cylinder or ram extender 86 having a ram 78 extensible from and retractable into its bottom end 88. It is convenient to apply force to jaw 14 by means of hydraulic cylinder or jaw mover 90. The top end 92 of hydraulic cylinder 90 may be pivotably mounted to the upper end 60 of head portion 50 of jaw 14 by means of a pivot block 96. The bottom end 94 of hydraulic cylinder 90 may be mounted to base 12 adjacent inner end 54 of arm portion 48 of jaw 14 by means of a pivot block 98. Pressurization of hydraulic fluid may be provided by an outside source or by a power plant 100 included as part of base 12.

Control 102 controlling the motion of jaw 14 and ram 78 may be included on base 12. Control 102 may, for example, consist of conventional hydraulic valves (not shown) controlled by actuators 104, 106 on base 12.

It is convenient to use a hydraulic system providing 2000 pounds per square inch of hydraulic pressure to have hydraulic cylinder or jaw mover 90 have a 3½ inch diameter piston with an 8 inch stroke and a 1½ inch rod and develop 15,708 pounds of force. It is convenient to use the 1½ inch diameter rod of a hydraulic cylinder 86 as ram 78 and to have the maximum force developed in hydraulic cylinder 86 of 14,137 pounds of force. It is convenient to utilize for control 102, a pair of hand operated hydraulic valves (not shown) having actuators 104, 106 within easy reach of an operator station 108. A valve controlling the raising and lowering of jaw 14 may conveniently have an off position, a raised position and a lowered position. It is convenient if this control remains in the last position actuated rather than returning automatically to a default position. It is convenient if the control valve for ram 78 provide for extension of ram 78 only when the operator moves the lever to an operation position and that the lever arm and control valve automatically return to a ram 78 raised position in which ram 78 is raised.

Figure 4:
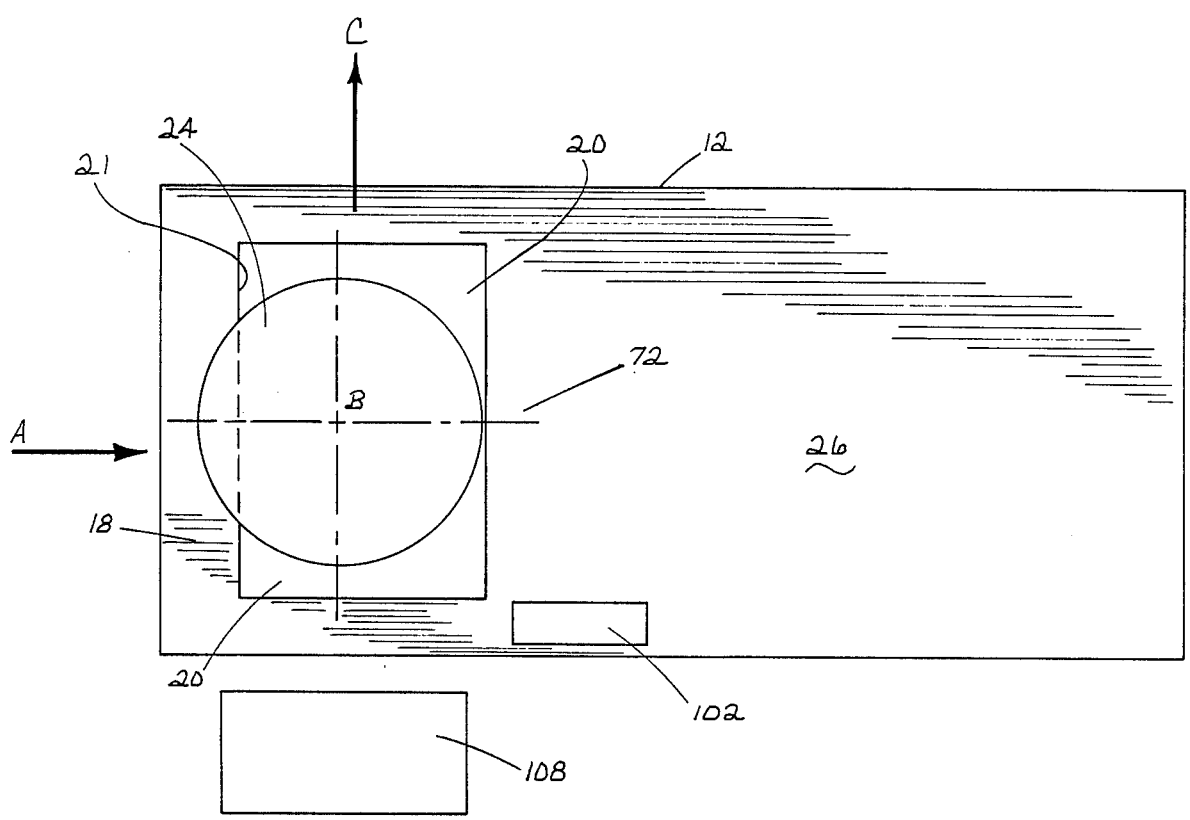
FIG. 4 is a diagrammatical view of the tire derimmer of the invention viewed from the top.

In operation, a mounted tire and wheel 84 is moved unto work surface 18 manually or by some other means such as, for example, a conveyor (not shown). A convenient direction of motion of a mounted tire and wheel 84 provided by such a conveyor is illustrated by arrow A in FIG. 4. The mounted tire and wheel 84 is positioned on working surface 18 of top 26 in position B in FIG. 4, so that the portion of wheel 24 most distant from jaw 14 overlies working surface 18 rather than opening 20 and so that the portion of wheel 24 closest to jaw 14 overlies opening 20 rather than working surface 18 and so that tire 22 overlies anvil portion 72 of working surface 18.

Force is then supplied to move jaw 14 toward base 12. Sufficient force may be applied to jaw 14 to overcome both the pressure of an inflated tire 84 and the resistance of the tire's bead 85 within the rim or wheel 24 so that the bead 85 can be broken away from the rim 24 and the tire 22 deflated by the same motion of jaw 14. Force then continues to be supplied to jaw 14, until the deflated tire 22 is clamped firmly between anvil portion 72 of working surface 18 and bearing surface 61 of lower end 62 of head portion 50 of jaw 14. Force continues to be supplied to jaw 14, for example, pressure is maintained within hydraulic cylinder or jaws mover 90, to clamp tire 22 throughout the derimming operation. It is convenient to regularly apply suffcent force on jaw 14 to break the bead between the tire carcass 22 and the rim of the wheel 24 no matter what corrosion may be present or what sealant may have been used in the mounting of the tire 22 and wheel 24. It is also convenient that the amount of force supplied to jaw 14 be insufficient so as to inelastically crush the tire carcass 22 clamped between jaw 14 and anvil portion 72.

In an embodiment of the invention in which punch 16 is freely pivotable from jaw 14, movement of jaw 14 from a raised position to a lowered position automatically, by the action of gravity, positions ram 78 over wheel 24. In other embodiments of the tire derimmer 10 of the invention punch 16 may be positioned over wheel 24 by other means. It may be convenient, even where punch 16 is freely pivotable; to swing punch 16 outward from jaw 14 in order to insure that ram 78 contacts the portion of wheel 24 within reach, so as to decrease skidding or sliding of ram 78 over portions of wheel 24.

Figure 2:
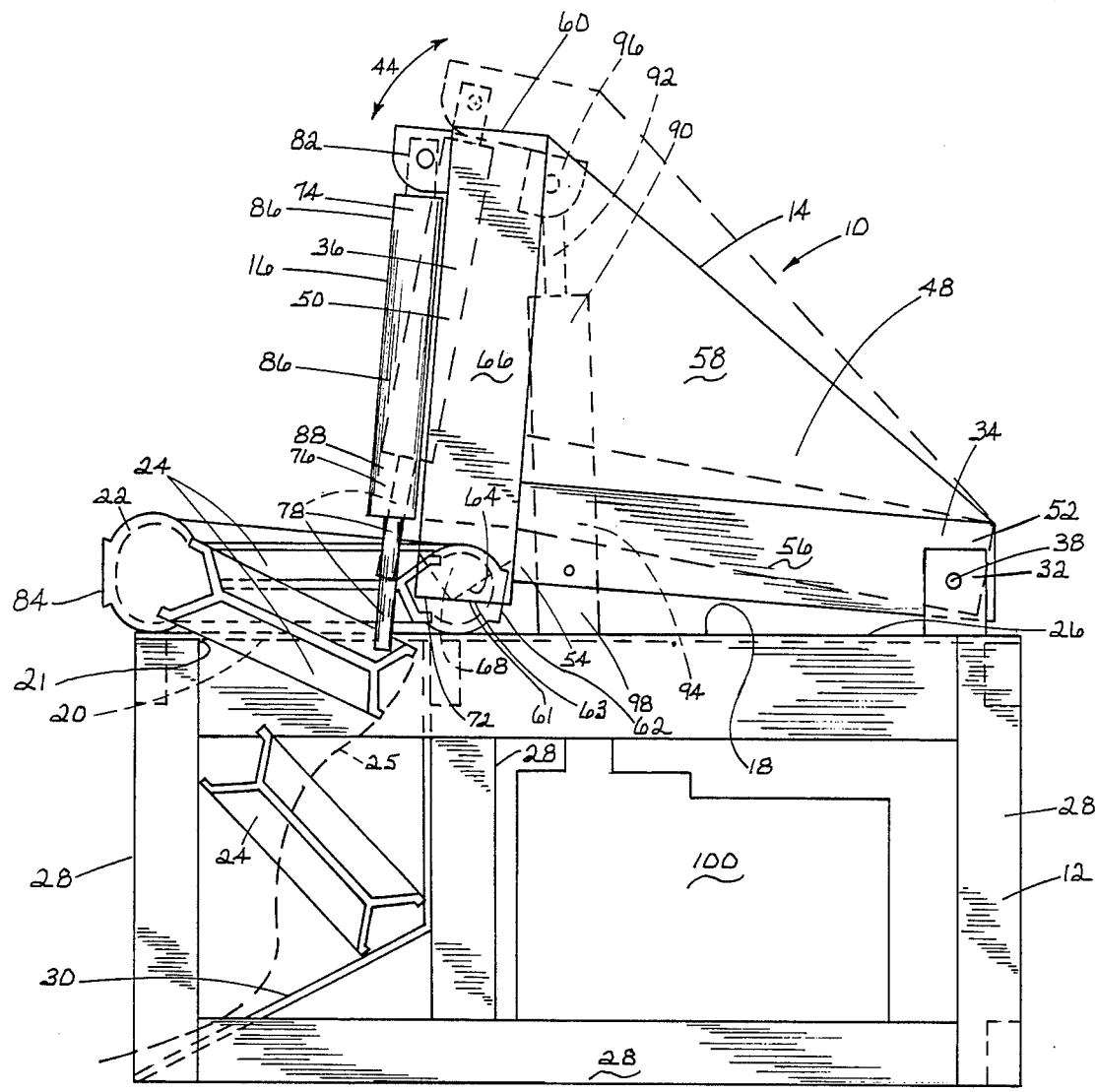
FIG. 2 is a side plan view of a modified tire derimmer of the invention.
Figure 3:
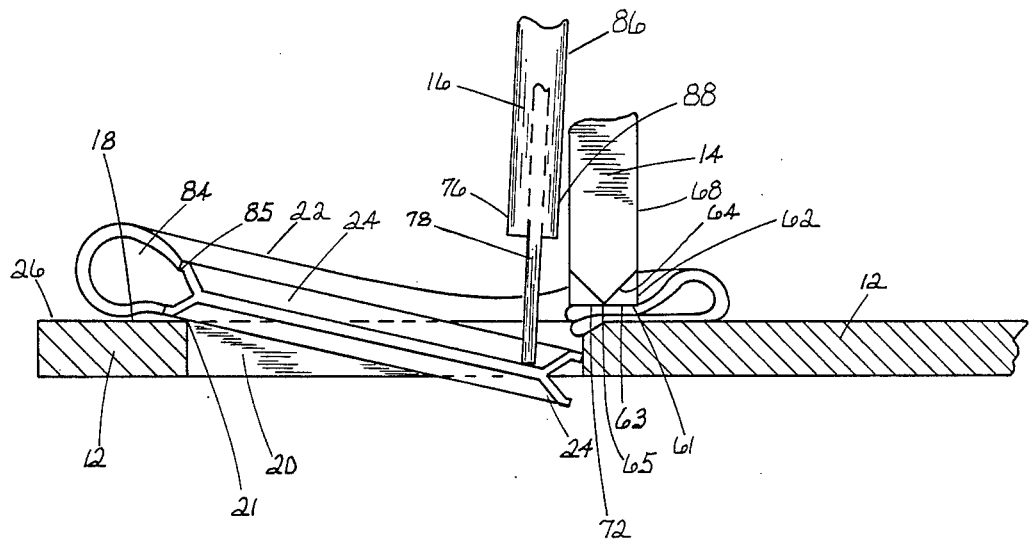
FIG. 3 is a diagrammatical view of the operation of the tire derimmer of the invention.

The ram 78 is then actuated so as to put it into contact with wheel 24. If punch 16 is freely pivotable and ram 78 has not already been positioned so as to be over the most recessed portion of wheel 24, ram 78 in extending out will slide along wheel 24, pivoting punch 16 until the most recessed portion of wheel 24 within reach. As ram 78 extends, wheel 24 will pivot about working edge 21, as a fulcrum, and wheel 24 will separate from tire 22. FIG. 2 shows the pivoting motion of wheel 24 about working edge 21 upon extension of ram 78. Wheel 24 will then drop as illustrated in FIG. 2 unto chute 30. Jaw 14 may then be raised and tire 22 removed from working surface 18. A convenient direction of removal of tire 22 is illustrated by Arrow C in FIG. 4.

While there have described above the principles of the invention in connection with a specific embodiment, it is to be clearly understood that the description is made only by way of example and not as a limitation as to the scope of the invention.

I claim:

1. A derimmer comprising a base, said base having an opening, said base having a working edge partially bounding said opening, said opening having a dimension extending in a direction generally perpendicular to said working edge of less than the diameter of said wheel, a jaw movably attached to said base, and a jaw mover operatively connected to said jaw, said jaw being movable by said jaw mover between a raised portion and a lowered position, said jaw in said lowered position clamping a tire mounted on a wheel against said base adjacent to said opening and opposite to said working edge, a ram connected to said jaw and a ram extender operatively connected to said ram, said ram being extendible by said ram extender against said wheel of a mounted tire clamped by said jaw to pivot said wheel about said working edge, thereby separating said wheel from said tire.

2. The derimmer of claim 1 wherein said ram is movably attached to said jaw, said ram being movable toward and away from said jaw.

3. The derimmer of claim 1 wherein said jaw is pivotably connected to said base, said jaw being pivotable between said raised position and said lowered position.

4. The derimmer of claim 1 wherein said opening has a dimension greater than the diameter of said wheel and less than the diameter of said tire extending in a direction generally parallel to said working edge.

5. The derimmer of claim 1 wherein said jaw has a bearing surface having a pair of substantially planar hammer portions separated by a wedged-shaped portion, said bearing surface being disposed to contact said tire during clamping of said tire to said base.

6. The derimmer of claim 5 wherein the lowermost part of said wedge portion is coplanar with said hammer portions.

7. The derimmer of claim 5 wherein said wedge shaped portion generally has the cross sectional shape of a right triangle.

8. A derimmer comprising a base, a jaw and a jaw mover operatively connected to said jaw, said jaw having a first end and a second end, and being pivotably connected to said base, said jaw being selectively movable by said jaw mover between a lowered position wherein a tire mounted on a wheel and supported by said base is clamped between said base and said second end of said jaw and a raised position wherein said second end of said jaw is spaced from said base, a ram, and a ram extender operatively connected to said ram, said ram being pivotably connected to said second end of said jaw, said ram being selectively extendible by said ram extender through the position occupied by said wheel of a tire mounted on said wheel and supported by said base.

9. The derimmer of claim 8 wherein said ram is freely pivotable toward and away from said jaw by the operation of gravity.

10. A derimmer comprising a base, said base having an opening, said base having a working edge adjoining said opening, said base having an anvil portion separated rom said working edge by said opening, a jaw and a jaw mover operatively connected to said jaw, said jaw having a first end and a second end, said first end being pivotably connected to said base, said second end being pivotably movable by said jaw mover toward and away from said anvil portion of said base, said jaw mover selectively retaining said second end of said jaw in clamping relation with said anvil portion of said base, a ram and a ram extender operatively connected to said ram, said ram pivotably mounted to said second end of said jaw, said ram being disposable over said opening by the pivoting of said jaw in relation to said base, said ram being pivotable in relation to said jaw about an axis vertically displaced from said base, said ram being extendible by said ram extender out from said axis a distance at least about equal to the displacement of said axis from said base, whereby a mounted wheel and tire is clamped to said base by said jaw and said ram is extended against said wheel to force said wheel from said tire.

11. The derimmer of claim 10 wherein said ram extender is a fluid cylinder pivotably connected to said second end of said jaw, and said jaw mover is a fluid cylinder pivotably mounted to said base and to said jaw to provide movement of said jaw relative to said base.

12. A derimmer comprising a base, said base having an opening, said base having a working edge partially bounding said opening, a jaw movably attached to said base and a jaw mover operatively connected to said jaw, said jaw being movable by said jaw mover between a raised portion and a lowered position, said jaw in said lowered position clamping a tire mounted on a wheel against said base adjacent to said opening and opposite to said working edge, a ram pivotably connected to said jaw and movable in relation to said jaw about an axis toward and away from said jaw, and a ram extender operatively connected to said ram, said ram being extendible by said ram extender against said wheel of a mounted tire clamped by said jaw to pivot said wheel about said working edge, said working edge being substantially parallel to the axis about which said ram is pivotable, thereby separating said wheel from said tire.

* * * * *